Aug. 18, 1931.     W. F. OBERHUBER     1,819,036
DISK PIPE JOINT
Filed Nov. 23, 1925
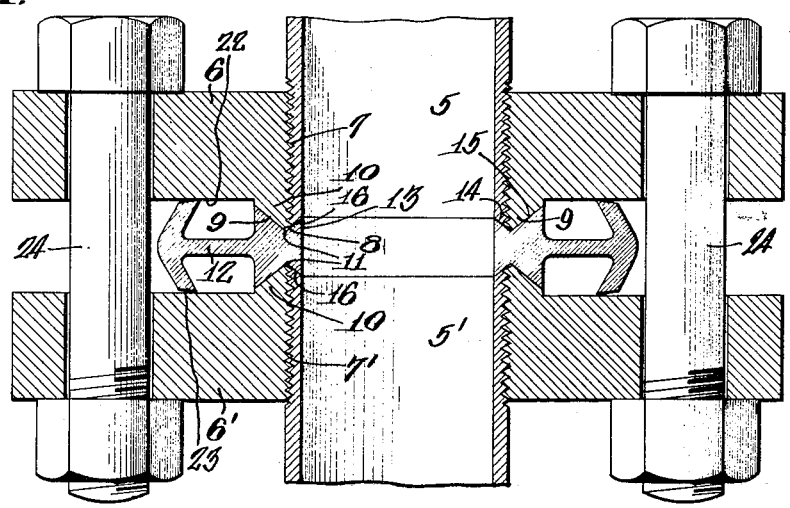
Fig.1.
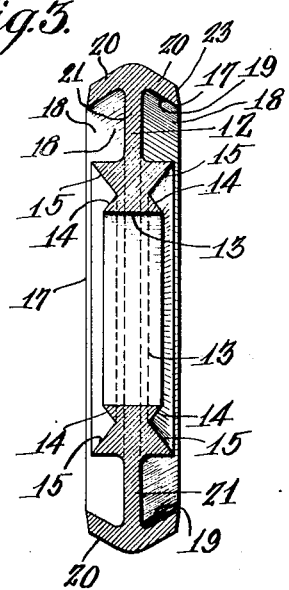
Fig.3.
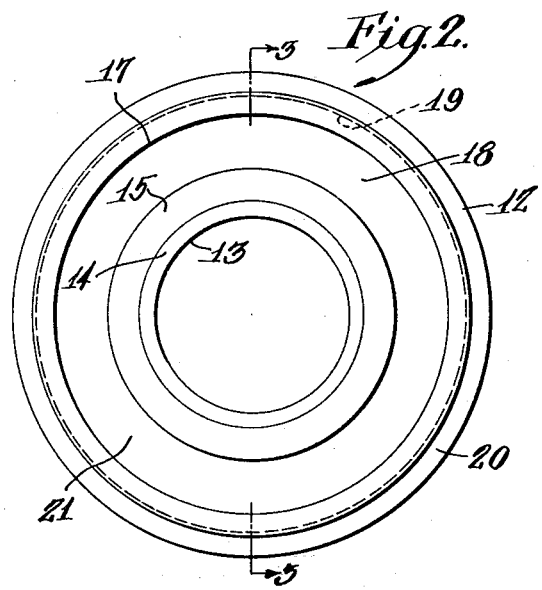
Fig.2.
Fig.3a.
Inventor:
William F. Oberhuber
by
Attorney
Witness:
Walter Chisin Patented Aug. 18, 1931

1,819,036

UNITED STATES PATENT OFFICE

WILLIAM F. OBERHUBER, OF LANSDOWNE, PENNSYLVANIA

DISK PIPE JOINT

Application filed November 23, 1925. Serial No. 70,858.

My invention relates to joints for flanged pipes.

The purpose of my invention is to seal against the pipe itself and also against a flange with which the pipe is connected.

A further purpose is to pinch the end of the pipe and a portion of a terminal flange together by the clamping action which tightens the joint.

A further purpose is to combine a rigid seal at the radial inner part of the joint in conjunction with a resilient surrounding outer seal.

Further purposes will appear in the specification and in the claims.

I have preferred to illustrate my invention by one form only, selecting a form which is practical, efficient, relatively inexpensive and thoroughly reliable and which at the same time well illustrates the principles of my invention.

Figure 1 is a fragmentary longitudinal section through two adjoining pipe sections united by one of my structures.

Figure 2 is a side elevation of a disk utilized in Figure 1.

Figure 3 is a section of Figure 2 taken upon lines 3—3.

Figure 3a is an enlarged section corresponding with the section of Figure 3 and showing the preferred contact, first with the pipe.

In the drawings similar numerals indicate like parts.

Wrought-iron and steel pipe sections are very generally united by threads with the flanges by which the joints are intended to be made. Notwithstanding great care in making the joint between the pipe and each such flange, and welding of the pipe to its flange, the thread joint between them remains one of the weak spots where leakage frequently takes place. Where attempt is made to avoid this and to avoid the troubles attendant upon packing the joint between the flanges, by welding the entire joint the initial cost is very high and the cost for repairs and replacements is correspondingly high. The pipe is also out of commission an undue length of time.

I have aimed to make the flanged joint more effective by sealing directly against the pipe along a surface radially inside of the thread, as well as against the flange, and have applied the pressure from the interior of the pipe in such a way as to increase effectiveness of the seal.

The two ends 5 and 5' of the pipe are shown as duplicates as are the flanges 6 and 6' to which the pipes are threaded at 7 and 7'. Each pipe end extends through the corresponding flange sufficiently to be accessible from the front for sealing purposes, as hereinafter described, and is chamfered at 8 at an angle with the chamfer 9 of a forwardly projecting flange rib 10.

It will thus be seen that the joint between the thread of the pipe and the thread of the flange lies somewhere within the circumferential surface represented by the inner chamfer preferably well inside of the line 11 joining the chamfers.

The sealing disk 12 is apertured at 13 to the size of the interior of the pipe and is grooved at the sides to present sloping surfaces 14 and 15 to seal against the chamfered edges 8 and 9. The contact between these two faces may be varied slightly so as to bring any proportion of the pressure desirable upon the inner chamfer 8 as compared with the outer chamfer 9. By cutting the surfaces 14 and 15 so as to make initial engagement preferably with the inner chamber 8 and thus to bring greater pressure upon the inner chamfer, tending to make tighter seal there, if desired, than against the outer chamfer, there will be a tendency to stretch the inner threaded end and tightened the end of the thread against the threaded surface of the flange. Where this is sought the meeting edges of the chamfers 8 and 9 may be slightly flatted to permit these surfaces to be drawn together by the faces engaging the apex of the angle between faces 14 and 15 without interference by reason of the edges.

It is desirable to make very firm contact along that portion 16 of the chamfer 8 which lies between the bottom of the thread upon the pipe and the interior of the pipe since this is unaffected by the cutting of the thread and forms an initial seal, which if fully effective, protects the threaded joint between the pipe and its flange from all pressures. In any event, in so far as it may be effective it reduces the pressure upon the threaded joint.

In Figure 3a the preferred form of contact is shown in which the gasket engages the pipe first, in order to wedge it outwardly and to seal very tightly against it as stopping leakage here protects from leakage through the thread. In order to secure a maximum seal and a resilient seal against the inner edge of the pipe I prefer to provide contact of the edge 14' of the gasket with the pipe edge 8' first and to slope the flange 14 more steeply than the slope of the flange 8. There is thus not only a tendency to wedge the pipe bodily outwardly but at the same time to spring the gasket so that its surface 14 will conform to the surface 8. In the illustration the slope of the surface 15 is also slightly steeper than that of the surface 9 so that the edge 15' of the surface 15 will engage the edge 9' of the surface 9 before the remaining parts of the surface engage but preferably subsequently to engagement of the edge 14' with the edge 8'. Therefore there will be a coresponding tendency to spring the gasket so that the surface 15 will conform to the surface 9.

It is desirable that when the flange is fully tightened the surfaces 14 and 15 so conform to the surfaces 8 and 9 that sealing will take place over the surfaces and not merely at the edges.

Conformation of these surfaces one to another of course, requires that there shall not be much difference in the slopes of the surfaces 14 and 15 with respect to the surfaces 8 and 9 and that the inner edge 14' shall not engage the inner edge 8' much in advance of the engagement of the outer edges 15' and 9' in attempting to obtain the advantage of this preferred feature.

The gasket disk carries additional sealing edges 17 separated from surfaces 14 and 15 by space 18 and undercut at 19 to give added resilience to the annular flanges 20 by which the sealing edges 17 are carried. Web 21 connects these resilient flanges with the body of the gasket disk.

The edges 17 seal against the plain flange faces 22 which are shown as lying to the rear of faces 14 and 15 for the purpose of allowing additional extension of the flanges 10 in direction parallel with the axes of the pipe and flanges.

The contact is improved and additional resilience is secured, by sloping the outer faces of the flanges 21 away from the plain faces 22 as at 23 so as to give higher pressure at the edges 17 than against the remainder of the side surfaces of the flanges. In the preferred form this sloping at 23 is carried to or close to the edge so as to narrow the radial extent of the line of initial contact at 17 almost to a line.

The flanges are bolted together as at 24 so as to firmly grip the sealing gasket between them.

Some allowance will ordinarily be required for bending of the flanges under strain and any such anticipated bending should be provided for by making the contact between the faces 8 and 9 of the pipes and flanges and the faces 14 and 15 of the gasket earlier than the contact between the edges or faces at 17 and the flanges, in order that a proper ultimate tightening at both places may be secured.

As will be recognized, the inner joint between faces 8 and 14 even if it be not wholly tight against the steam, oil, or other fluid under pressure will greatly reduce the pressure of any fluid which leaks through, reducing the chance of its leaking back through an imperfectly welded thread-and-flange-joint or of its leaking through the further joint between faces 9 and 15. For the same reason, whatever steam, oil or other fluid under pressure leaks through between faces 9 and 15 and into the spaces 18 will have a greatly reduced pressure as compared with the pressure within the pipe, so that it may readily be held by the spring joint between the faces or edges at 17 and the adjoining flanges.

The gasket can be ground in, separately against the two sides or by tightening two bolts slightly, against both sides at the same time, improving the quality of the joint and reducing the pressure required to hold it tight.

It will be evident that I have provided a seal in the form of a gasket which may be manufactured and shipped to place for use and whose insertion or replacement involves very little work and requires a minimum of removal of heat insulation. At the same time my joint makes it possible to tighten the thread against the flange if it be in the least loose and secures resilience in one of the sealing devices by which the tightness of the joint is insured.

In view of my invention and disclosure herein, modifications and changes will doubtless occur to others skilled in the art, suiting to special needs or individual whims, or enabling them merely to secure all or a part of the benefit of my invention without copying my disclosure. For this reason it is my intention to protect herein all such modifications and changes as come reasonably within the spirit and scope of my invention.

Having thus described my invention what I claim as new and desire to secure by Letters Patent is:—

1. In a pipe joint, two pipes having threaded ends and interiorly chamfered at their ends, two flanges, one threaded upon the end of each pipe and having adjacent the end of the pipe chamfers sloping oppositely to the chamfers within the pipe ends upon which they are mounted, a gasket having annular grooves on opposite sides engaging the chamfers of the pipes and flanges and bolts forcing the flanges together to seal between the chamfers and the gasket.

2. In a pipe joint, two pipes having threaded ends and interiorly chamfered at their ends, two flanges, one threaded upon the end of each pipe and having, adjacent the end of the pipe, chamfers sloping oppositely to the chamfers within the pipe ends upon which they are mounted, a gasket having annular grooves on opposite sides engaging the chamfers of the pipes and flanges and of such dimensions as to bear more tightly upon the inner surfaces of the pipe chamfers than upon the flanges and tightening means for the flanges to grip the gasket between them.

3. In a pipe joint two pipes having threaded ends and interiorly chamfered at their ends, two flanges, one threaded upon the end of each pipe and having adjacent the end of the pipe chamfers sloping oppositely to the chamfers within the pipe ends upon which they are mounted, a gasket having annular grooves on opposite sides to engage the chamfers, annular contact members carried by the gasket engaging the flanges upon opposite sides of the gasket, adapted to make contact with the flanges along a narrow annular surface, and tightening means for holding the flanges together to grip the faces within the groove of the gasket and the contact members.

4. In a pipe joint two pipes having threaded ends and interiorly chamfered at their ends, two flanges, one threaded upon the end of each pipe and having adjacent the end of the pipe chambers sloping oppositely to the chamfers within the pipe ends upon which they are mounted, a gasket having annular grooves on opposite sides to engage the chamfers, annular contact members mounted upon opposite sides of the gasket and engaging the flanges, along narrow annular surfaces, the contact members being undercut to provide resilience and fastening means for holding the flanges together to grip the sealing faces of the gasket.

5. In a pipe joint two pipes having threaded ends and interiorly chamfered at their ends, two flanges, one threaded upon the end of each pipe and having adjacent the end of the pipe chamfers sloping oppositely to the chamfers within the pipe ends upon which they are mounted, a gasket having annular grooves on opposite sides to engage the chamfers, annular edge engaging contact members upon opposite sides of the gasket adapted to make contact with the flanges along a narrow annular surface each, the contact members being relieved outwardly from their engaging edges to reduce the surface of contact and undercut from the inside outwardly to add elasticity, and means for tightening the pipe flanges about the gasket.

6. As an article of manufacture a metallic apertured sealing gasket having opposite, outwardly facing sealing annuli near its aperture and annular resilient inwardly springing engaging faces diagonal to its axis and spaced radially from the annuli.

7. A sealing gasket comprising a metallic ring having adjacent its interior opposite outwardly facing grooves forming sealing faces on both sides of each groove and having spaced therefrom inwardly facing resilient annular contact members diagonal to its axis.

8. A sealing gasket comprising a ring having, adjacent its interior, opposite outwardly facing grooves forming sealing faces on both sides of each groove and having spaced therefrom inwardly facing undercut resilient annular contact members.

9. In a pipe joint, a pipe threaded at the end, a flange threaded upon the pipe, the pipe and flange being chamfered oppositely to form surfaces projecting in combined cross sections, one annular surface on the inside and the other on the outside of the thread, a gasket having a groove presenting an incut cross section of surfaces corresponding generally to the chamfers on the pipe and flange and means for tightening the gasket against the pipe and flange to seal separately against them.

10. In a pipe flange joint, a flanged pipe presenting oppositely chamfered annular faces projecting in cross section at the end away from the pipe length, a gasket engaging the oppositely chambered faces and a sealing flange on said gasket of larger diameter than said faces, interiorly undercut and engaging the pipe flange along the inner edge of the sealing flange.

11. A pipe interiorly chamfered at its outer end in a single outwardly flaring slope, a flange threaded upon the pipe, a gasket engaging the chamfer upon the pipe to tighten the thread engagement of the pipe with its flange and means for tightening the gasket against the flange.

12. A pipe, a flange mounted upon the end of the pipe, the pipe and flange presenting oppositely chamfered axial projecting surfaces about the joint between them, a gasket grooved to engage the chamfers and a spring sealing flange upon the gasket of larger diameter than the chamfers and adapted to engage the pipe flange subsequent to engagement of the walls of the groove with the chamfers.

WILLIAM F. OBERHUBER.